United States Patent [19]
DuPont

[11] Patent Number: 5,936,825
[45] Date of Patent: Aug. 10, 1999

[54] RISE POLE TERMINATION/ARRESTOR COMBINATION

[75] Inventor: John Phillip DuPont, Waukesha, Wis.

[73] Assignee: Copper Industries, Inc., Houston, Tex.

[21] Appl. No.: 09/040,256

[22] Filed: Mar. 18, 1998

[51] Int. Cl.$^6$ .................................................. H02H 3/22
[52] U.S. Cl. ............................ 361/127; 361/117; 337/33
[58] Field of Search ..................... 361/117, 121, 361/126, 127, 131, 132; 337/28, 33, 34; 174/2, 17 R, 38, 40 R, 50, 52.1

[56] References Cited

U.S. PATENT DOCUMENTS

| | | | |
|---|---|---|---|
| 1,438,954 | 12/1922 | Folds ......................................... | 361/117 |
| 1,527,525 | 2/1925 | Pacent ....................................... | 361/117 |
| 3,187,175 | 6/1965 | Lang .......................................... | 362/431 |
| 3,435,397 | 3/1969 | Sankey et al. ............................. | 337/34 |
| 4,326,232 | 4/1982 | Nishiwaki et al. ....................... | 361/127 |
| 4,404,614 | 9/1983 | Koch et al. ............................... | 361/128 |
| 4,467,387 | 8/1984 | Bergh et al. .............................. | 361/132 |
| 4,782,423 | 11/1988 | Takagi et al. ............................ | 361/127 |
| 4,930,039 | 5/1990 | Woodworth et al. .................... | 361/127 |
| 5,210,676 | 5/1993 | Mashikian ................................ | 361/117 |

OTHER PUBLICATIONS

J.P. DuPont, "Overvoltage Surges of the 15 kV URD System and the Effect of Lead Length of the Riser Pole Arrester," IEEE T&D Conference in Chicago, Illinois, on Apr. 14, 1994.

*Primary Examiner*—Sally C. Medley
*Attorney, Agent, or Firm*—Fish & Richardson P.C.

[57] ABSTRACT

Protection of a cable, its termination and other apparatus from lightning strikes on an overhead line is provided by housing a surge arrestor and a cable termination, which are connected in parallel in a common housing, but as separate components not sharing the same axial line. With this configuration, minimal lead length is provided without sacrificing serviceability.

20 Claims, 3 Drawing Sheets

RISE POLE TERMINATION/ARRESTOR COMBINATION

BACKGROUND OF THE INVENTION

1. Field of the Invention

The present invention relates to an electrical protective, high voltage dissipation device for an electrical energy distribution system and, more particularly, to a lightning arrestor which also serves as a riser pole terminator for an Underground Residential Distribution (URD) cable or the like.

2. Discussion of Related Art

Underground Residential Distribution (URD) cables are presently used for medium- and high-voltage (e.g., 15 kV, 25 kV and 35 kV class) distribution systems which are normally connected to overhead lines at some point by pot-head insulator terminations or connected to transformers or the like by suitable connector insulators.

The URD cable is terminated, i.e., the electrical path is changed from an insulated and shielded cable, suitable for underground use, to a bare or insulated overhead line. This termination typically takes the form of an insulated conductor passing through a heavy porcelain connector insulator with arc-over protection, or a polymer connector insulator. The URD cable is also protected from overvoltage surges due to lightning strikes, for example, by a surge arrestor.

Typically, these two different functions of terminating a URD cable and protecting the URD cable from overvoltage surges are performed by two separate devices 13, 14 located at the riser pole 10, such as shown in FIG. 1. One device is a riser pole URD overhead cable terminator 14. The second device is a riser pole arrestor 13 mounted in parallel to the terminator 14. The riser pole URD cable terminator 14 may be connected in series to a cut-out fuse device 12, which includes a fuse connected across an insulator mounted to the riser pole 10. The cut-out fuse/terminator combination is mounted in parallel with the surge arrestor 13 as shown.

Electric utility companies typically mount the surge arrestor 13 and the cable terminator 14 near to or on the cross arm of a utility pole 10. A central conductor of the URD cable 16 is electrically connected to the overhead high voltage line 11 through the riser pole cable terminator 14, whereas its outer conductor is connected to ground through a ground lead 15, as shown in FIG. 1. Mounting devices of any kind to utility poles is generally a costly proposition and mounting surge arrestors in particular requires care in keeping the leads as short as possible to provide optimal protection.

Recurrent failures of URD insulation systems due to lightning strikes has placed a renewed emphasis on the manner in which surge arrestors are connected. Studies have shown that long lead lengths create problems resulting in a lack of protection, such as illustrated in the IEEE guide for unjacketed concentric or semiconducting jacketed direct buried cable used as a pole ground and insulated jacketed cable with separate pole ground conductors, according to C62.22.1-1996.

A long lead length can minimize the percent of margin of protection (MOP) when a fast rise time occurs even on a 15 kV system. Fast rise times are prevalent in lightning surges. This is because of the large inductive voltage drop in the connection leads during fast surges. This voltage is equal to Ldi/dt, with the inductive element L being due to the length of connected leads which conduct a substantial and rapidly changing amount of current during a lightning surge.

It is an industry recommendation that a 20% margin of protection be provided. A margin of protection is the margin of insulation withstand above the arrestor protection level and it is calculated by using an 8 microsecond rise time. However, even at this margin of protection level, the protective levels are not adequate because lightning surges often do not follow classical guidelines. In accordance with C62.22-1991, lightning surges are often faster rising than 8 microseconds creating higher Ldi/dt voltages and thus lower MOP levels. The percent MOP is calculated with the following equation:

$$\% \, MOP = \left( \frac{B.I.L. - V_{max}}{V_{max}} \right) 100\%$$

wherein B.I.L. is the Basic Lightning Impulse insulation level, and $V_{max}$ is the maximum overvoltage found in a URD system.

The twenty percent MOP was chosen to allow for aging of transformers, cables, and cable accessories and still adequately protect for overvoltage surges.

The 8/20 μsec discharge voltage characteristics of the arrestor plus the Ldi/dt of the leads is used to calculate the MOP. The series connected leads of the arrestor have an inductance approximately equal to 0.4 μh/ft. This voltage drop (kV/ft) of the leads for various surge current magnitudes and rise times of the surge front are as follows.

TABLE 1

| | kV/ft of Lead | | | | |
|---|---|---|---|---|---|
| Rise Time (μsecs) | 5 kA (kV/ft) | 10 kA (kV/ft) | 20 kA (kV/ft) | 40 kA (kV/ft) | 65 kA (kV/ft) |
| 0.1 | 20 | 40 | 80 | 160 | 260 |
| 0.5 | 4 | 8 | 16 | 32 | 52 |
| 1.0 | 2 | 4 | 8 | 16 | 26 |
| 2.0 | 1 | 2 | 4 | 8 | 13 |
| 4.0 | 0.5 | 1 | 2 | 4 | 6.5 |
| 8.0 | 0.25 | 0.5 | 1 | 2 | 3.25 |
| 10.0 | 0.2 | 0.4 | 0.8 | 1.6 | 26 |

The voltage drop significantly increases as the rise time becomes faster for a given current magnitude. Thus, lead length has a direct bearing on the sufficiency of the MOP. For instance, the percent MOP at a 1 μsec rise time for most lead lengths falls below the 20% requirement level according to the following table.

TYPICAL PERCENT MOP AT 1 μSEC RISE TIME FOR 15 kV URD SYSTEM

| | Length of Lead in Feet | | | | | | | |
|---|---|---|---|---|---|---|---|---|
| Current(kA) | 3 | 4 | % | 6 | 7 | 8 | 9 | 10 |
| 5 | 64.1 | 52.2 | 42.0 | 33.1 | 25.2 | 18.3 | 120 | 6.6 |
| 10 | 25.8 | 12.3 | 1.3 | −7.7 | −15.1 | −21.4 | −26.8 | −31.4 |
| 20 | −12.6 | −25.3 | −34.8 | −42.1 | −47.8 | −52.5 | −56.4 | −59.7 |

This table shows that lead lengths are detrimental when fast rising surges occur in a 15 kV URD systems.

In recognition of the importance of lead line length, Matthew S. Mashikian poses in U.S Pat. No. 5,210,672 the complete elimination of lead lines for the parallel connection of cable terminator connection to a lightning arrestor using a configuration such as shown in FIG. 2. In the Mashikian patent, an electrical protective device 20 for high voltage cable termination from an overhead transmission line is proposed wherein a tubular insulator $22_1$ is provided. An insulated conductor $22_3$ passes through the center of the tubular insulator $22_1$ of the cable 22. The central conductor $22_3$, when in service, will be exposed to a voltage of the overhead conductor at one of its ends and to a ground voltage at the other end. A surge arrestor $21_3$ is concentrically disposed about the tubular insulator $22_1$, and the conductor $22_3$ and the surge arrestor $21_3$ have common terminals at their ground and high voltage ends. The surge arrestor $22_3$ includes voltage-dependent resistors of a toroidal configuration disposed concentrically about the tubular insulator $22_1$, with an outer annular insulator $21_2$ disposed about the surge arrestor $21_3$.

With this configuration, the surge arrestor $21_3$ is said to contribute to the electrical stress grating of the termination and is desirably the sole stress grating means. The Mashikian patent identifies the preferred embodiment of the voltage arrestor $21_3$ as being a stack of rings of semiconductive voltage-dependent resistant material with conductive elements $22_5$ and $22_6$ extending across the ends of the surge arrestor $21_3$ and the tubular insulator $22_1$ to provide a common terminal therefor. The concentric rings may be in the form of toroidal rings of conventional metal oxide voltage-dependent resistant semi-conductor material but may also take the form of semicircular blocks or otherwise segmented rings to be used to impart a degree of resilience.

Thus, the Mashikian patent expressly discloses the desirability of absolutely minimizing the amount of conductive material for interconnecting in parallel the surge arrestor components to the cable termination.

However, with this configuration, a number of problems occur. First, for instance, the surge arrestor must be specially formed of semiconductor material in the form of toroidal or segmented toroidal rings. This requires a unique configuration and shape of surge arrestor components not previously found in the prior art, with tight tolerances and little adaptability. This product is difficult to manufacture because the insulator 22 is hard to design. The insulator 22 must be able to accept a wide range of cable diameters, which is hard to accomplish. If the cable diameter is small there will not be enough interference fit and the insulator may flash over. If the cable diameter is large, it will be difficult to install the cable through the insulator 22.

SUMMARY OF THE INVENTION

In light of these and other problems of the prior art, the present invention has for an object the provision of an electrical protective device which provides surge arresting properties for high voltage connections to overhead lines in which the length of the connecting lead is substantially reduced, but not at an absolute minimum, while providing an adaptability and a serviceability, the combination of which is not found in the prior art.

This object and other objects are provided by a device in which the surge arrestor and the cable termination are provided in a common housing but as discrete elements within that housing and with highly desirable insulating characteristics.

The present inventor has now found the foregoing and related objects may be attained by an electric protective device or high voltage cable termination from an overhead transmission line comprising a cable including an outer conductor adaptedly connected to ground, an intermediate insulating layer, and an inner conductor adapted to carry current during normal operation; a surge arrestor including at least one voltage dependent resistor; an arrestor/cable electrical connector electrically connecting at least one voltage dependent resistor of the surge arrestor to the inner conductor of the cable, a ground electrical connector for electrically connecting another end of the voltage dependent resistor of the surge arrestor to the outer conductor of the cable; and a housing in which the surge arrestor and a terminal portion of the cable are commonly housed, wherein an axial line of the at least one voltage dependent resistor of the surge arrestor is spaced from the axial line of the terminal portion of the cable.

BRIEF DESCRIPTION OF THE DRAWINGS

The present invention will now be described by way of exemplary embodiments, to which it is not limited, as shown in the accompanying figures in which.

DETAILED DESCRIPTION

Figure 3:
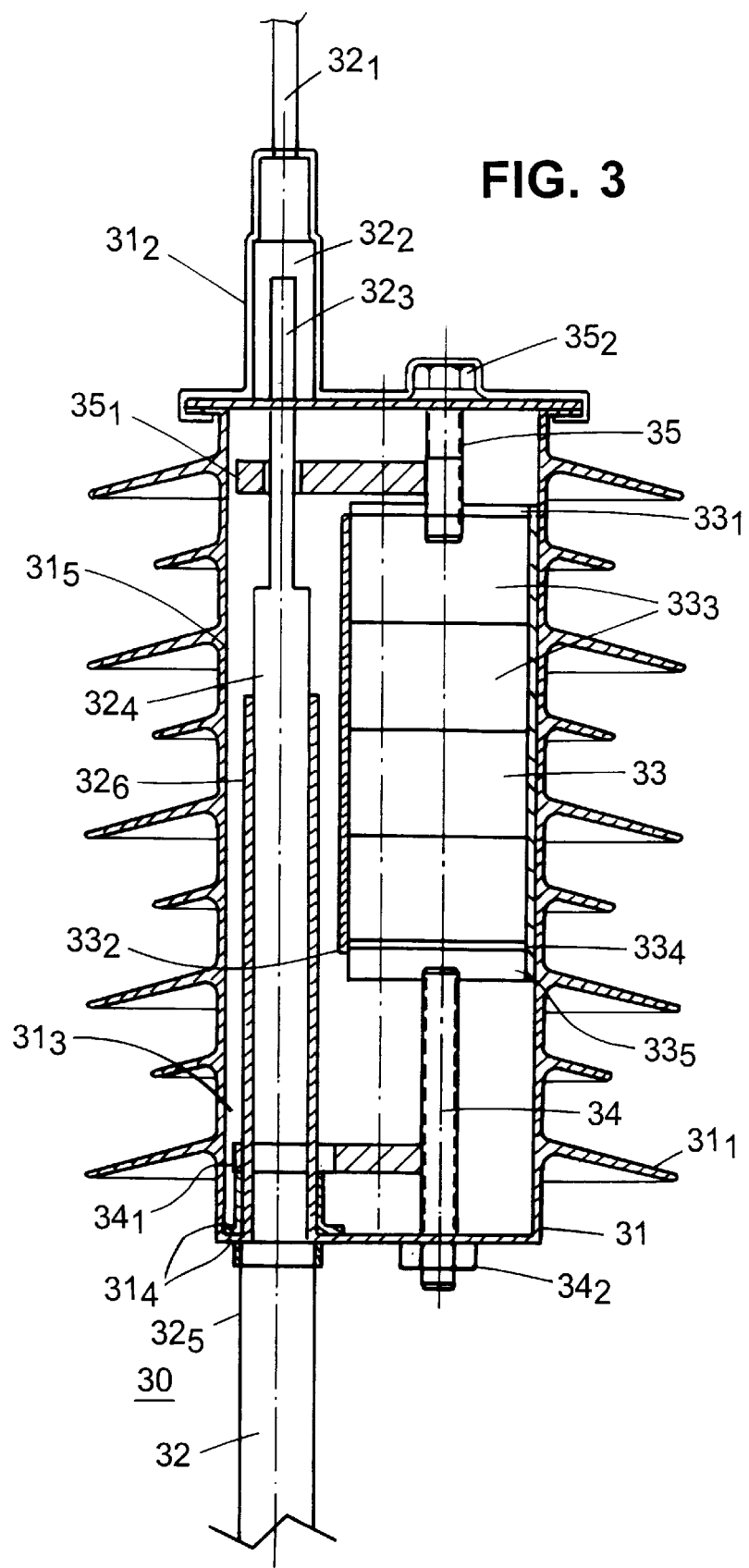
FIG. 3 illustrates a first embodiment in accordance with the present invention.
Figure 4:
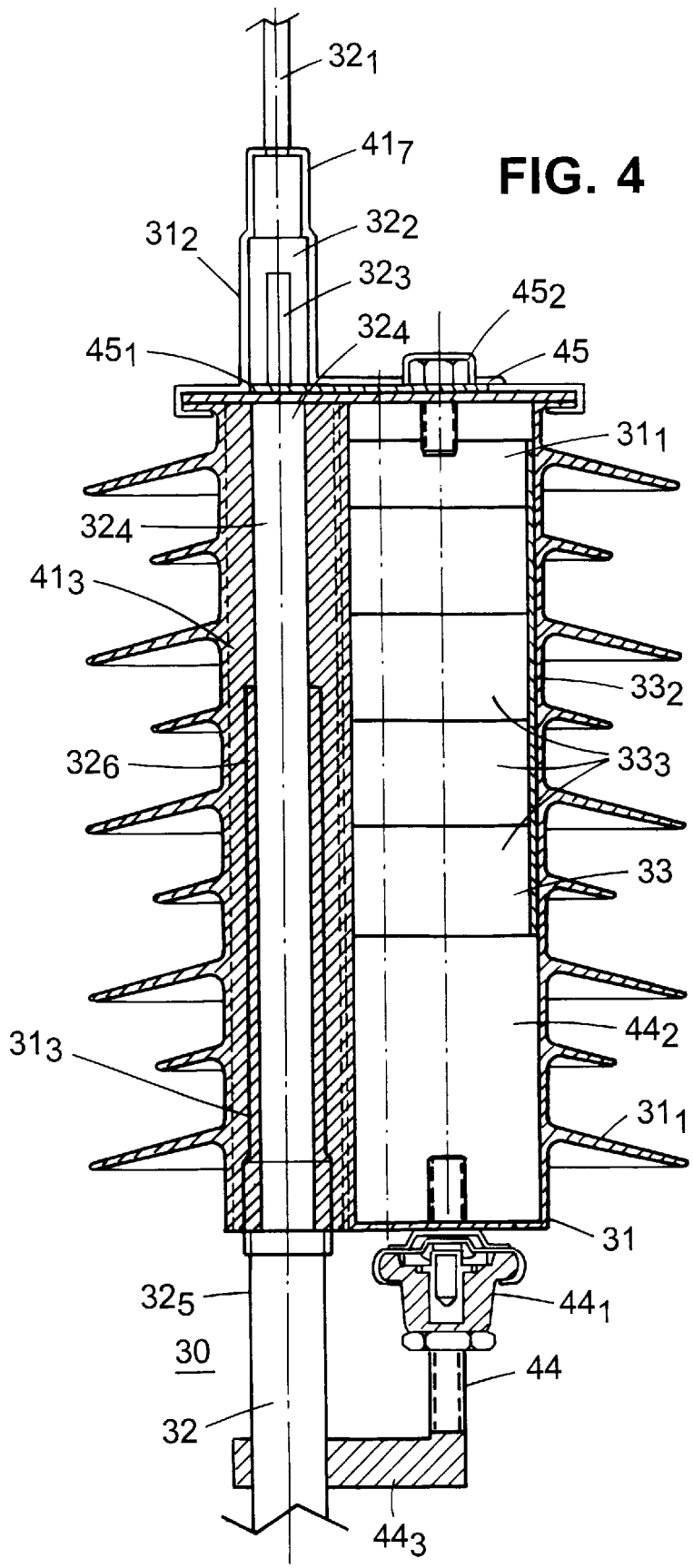
FIG. 4 illustrates a second embodiment in accordance with the present invention.

The present invention is illustrated using two embodiments shown in FIGS. 3 and 4. As shown in FIG. 3, the electrical protective device 30 includes a housing 31 formed of materials such as an outdoor polymer. This polymer could be silicone, EPDM, or other suitable outdoor rubber. The electrical protective device 30 could also be porcelain. The exterior surface of the housing 31 can include sheds or undulations $31_1$ which increase the electrical leakage path. The increased surface leakage paths assists in avoiding breakdown through surface flashover. The housing 31 can have an upper rubber seal or boot $31_2$ for receiving a pin connector $32_1$ of a cable 32. Inside the housing 31, a tube $31_3$ of fiberglass or a molded epoxy resin can be to hold insulating fluid. On the lower portion of the housing 31 and the tube $31_3$ are openings through which the cable 32 is inserted via a lower rubber seal $31_4$ or the like. In the context of this application, "upper" means closer to the overhead power lines and "lower" means further from the overhead power line. The tube $31_3$ can be filled with an insulating fluid such as polybutylene in the first embodiment shown in FIG. 3. As shown in FIG. 4, the insulating fluid $31_5$ is replaced with a housing filler $41_3$ having an interference fit for the cable 32. Other insulating mechanisms may be employed such as silicone oil.

Figure 1:
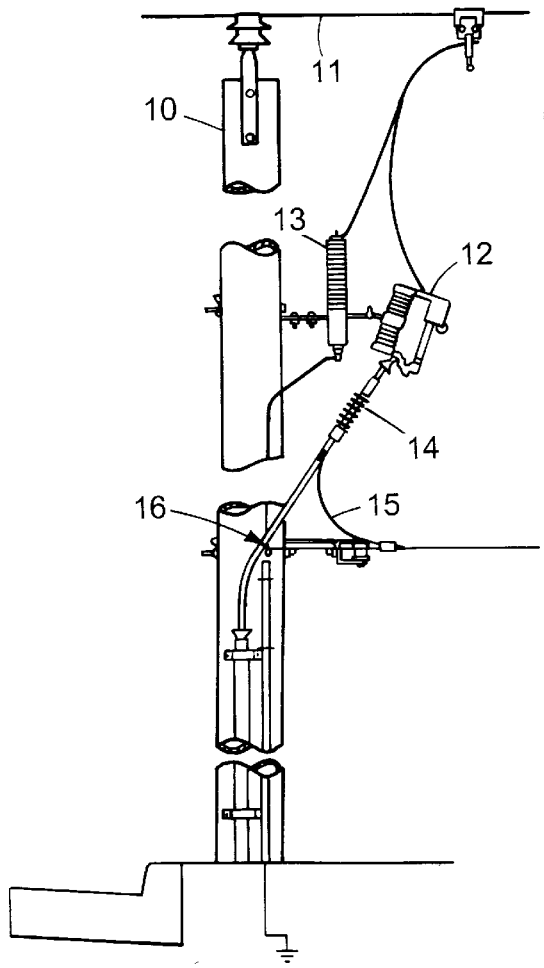
FIG. 1 illustrates a conventional parallel connection of a lightning arrestor and a riser pole terminator.
Figure 2:
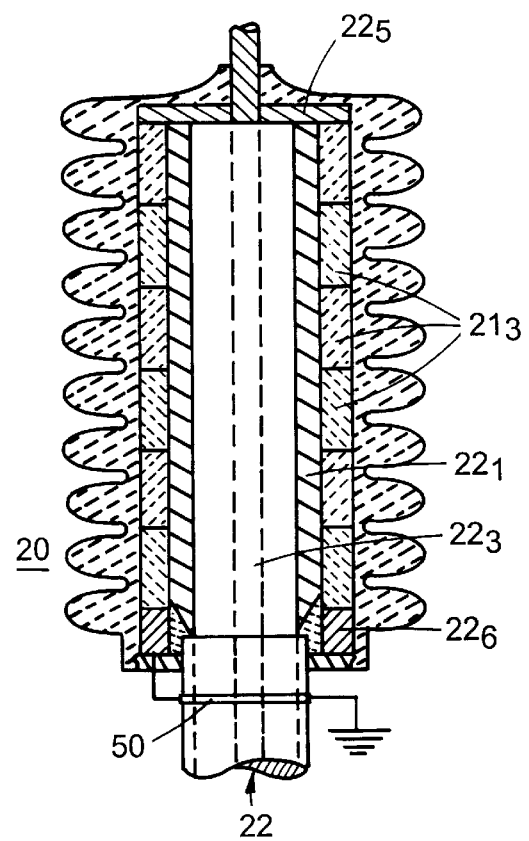
FIG. 2 illustrates a combination of a toroidal lightning arrestor surrounding a cable in accordance with U.S. Pat. No. 5,210,676.

The cable 32 includes the pin connector $32_1$ projecting out of the top of the housing 31. The pin connector $32_1$ is attached to a crimp connector $32_2$. The crimp connector $32_2$ is connected to the inner conductor $32_3$ of the cable 32. Around the inner conductor $32_3$ of the cable 32 is an insulating layer $32_4$, which may include insulating material and, perhaps, a semiconducting layer. A neutral wire $32_5$ forms the outer sheathing of the cable 32. The insulating layer $32_4$ and the neutral wire $32_5$ are maintained at ground potential while the central conductor is energized to an elevated potential level, e.g., connected to an overhead conductor 11 (FIG. 1).

To terminate the cable 32 to a bare electrical conductor $32_3$, the insulating layer $32_4$ is cut back. In this configuration, the voltage would rise abruptly from zero at the edge of the cutback insulating layer $32_4$ to a significant portion of the total conductor voltage. This abrupt voltage rise would produce a high gradient capable of causing an electrical arc or flashover and damaging the cable termination. To reduce this gradient or electrical stress, stress relief devices such as shown schematically as the high voltage stress control $32_6$ may be used adjacent to the cutback edge of the insulating layer $32_4$.

A surge arrestor 33 connected in parallel to the cable 32 includes a top conducting block $33_1$ and a bottom conducting block $33_4$ between which are voltage dependent resistors $33_3$ made from such semiconductor materials as metal oxide and zinc oxide, in the form of a metal oxide varistor (MOV) or spark gaps with resistive rings. The top conducting block $33_1$, the voltage dependent resistors $33_3$, and the bottom conducting block $33_4$ can be held together by a glass tape and epoxy coating $33_2$. A hold plate $33_5$ schematically represents a means for maintaining voltage dependent resistors $33_3$ in close electrical contact to the top conducting block $33_1$ and the bottom conducting block $33_4$. The hold plate $33_5$ may be in the form of a simple metal plate or a metal plate and biasing means (e.g., spring) mechanism to provide bias for holding the various components together.

The cable 32 and the surge arrestor 33 are connected together by a ground connector 34 and an arrestor/cable connector 35. The ground connector 34 in the first embodiment shown in FIG. 3 includes a spring loaded connector $34_1$ for attaching the neutral wire $32_5$ of the cable 32 to the bottom connecting block $33_4$ of the surge arrestor 33. Between the spring loaded connector $34_1$ and the surge arrestor 33 is a conductive material such as a metal rod threadingly engaging the hold plate $33_5$ and a lower portion of the housing 31 by means of a connector bolt $34_2$.

As illustrated in FIG. 4, the ground connector 44 includes a threaded connection $44_1$ for connecting the surge arrestor 33 to a ground and connection block $44_2$, which in turn is electrically connected to a common ground connection $44_3$ electrically connected to the neutral wire $32_5$ of the cable 32.

At the other end of the surge arrestor 33 is an arrestor/cable connector 35 shown in FIG. 3 or an arrestor/cable connector 45, as shown in FIG. 4. The surge arrestor/cable connector 35 of the first embodiment includes a spring loaded connector $35_1$ and a connector for connection to the pin connector $32_1$ of the cable 32 and a connector bolt $35_2$ for connecting the spring loaded connector $35_1$ to the top connecting block $33_1$ of the surge arrestor 33 to the housing 31. The arrestor/cable connector 35 of the first embodiment is completely within the housing 31. In contrast, in the second embodiment shown in FIG. 4, the arrestor/cable connector 45 can be external to the housing 31 and includes a connector plate $45_1$ such as a stainless steel with a spin welded crimp connector attached thereto for connecting the inner conductor $32_3$ to the pin connector $32_1$ of the cable 32. A connector bolt $45_2$ connects the plate connector $45_1$ to the top conductor block $33_1$ of the surge arrestor 33 in the exemplary embodiment. Optionally, a silicone rubber boot $41_7$ can be placed over the pin connector $32_1$, the crimp connector $32_2$ and the connector bolt $45_2$ in the second embodiment shown in FIG. 4.

The common housing 31 improves aesthetic, provides an adequate margin of protection while reducing assembly and mounting cost without the needed complexity of toroidal voltage dependent resistors and the like.

It can be seen from the foregoing detailed description and the attached figures that the protection device of the present invention combines cable termination and surge arrestor functions in a simple and effective way to increase the protection level attainable with reduced installation time while improving serviceability and maintenance. The device may be employed in several forms to effect cable terminations to overhead transmission lines or transformers or the like and may take the form of bushing connectors or elbow connections in various electrical devices.

The present invention has been described by way of exemplary embodiments to which it is not limited. Other variations and modifications will occur to those skilled in the art without departing from the spirit and scope of the present invention as defined in the appended claims.

I claim:

1. An electric protective device comprising:
    a cable including an outer conductor adapted to be connected to ground, an intermediate insulating layer, and an inner conductor adapted to carry current during normal operation;
    a surge arrestor including at least one voltage dependent resistor;
    an arrestor/cable electrical connector electrically connecting one end of said at least one voltage dependent resistor of said surge arrestor to said inner conductor of said cable;
    a ground electrical connector electrically connecting another end of said at least one voltage dependent resistor of said surge arrestor to said outer conductor of said cable; and
    a housing in which said surge arrestor and a terminal portion of said cable are commonly housed,
    wherein an axial line of said at least one voltage dependent resistor of said surge arrestor is spaced from and generally parallel to an axial line of said terminal portion of said cable.

2. An electric protective device according to claim 1, wherein said arrestor/cable electrical connector includes a spring loaded clamp for connection to said outer conductor of said cable.

3. An electric protective device according to claim 1, wherein said ground electrical connector includes a spring loaded clamp for connection to said outer conductor of said cable.

4. An electric protective device according to claim 1, wherein said arrestor/cable electrical connector includes a plate connector.

5. An electric protective device according to claim 1, wherein said cable includes a pin connector electrically connected to said inner conductor by a crimp connector.

6. An electric protective device according to claim 1, wherein said surge arrestor includes a top connector block and a bottom connector block.

7. An electric protective device according to claim 1, wherein said surge arrestor includes a glass tape and epoxy coating.

8. An electric protective device according to claim 7, wherein said surge arrestor further includes a hold plate.

9. An electric protective device according to claim 1, wherein said housing includes sheds along side surfaces thereof.

10. An electric protective device according to claim 1, wherein said housing includes rubber seals at the intersection of said cable and walls of said housing.

11. The electric protective device of claim 1, wherein:
    a physical connection between the ground electrical connector and the outer conductor of the cable is positioned at a first end of the voltage dependent resistor, and
    a physical connection between the arrestor/cable electrical connector and the inner conductor of the cable is positioned at a second end of the voltage dependent resistor, the second end being located opposite the first end.

12. The electric protective device of claim 11, wherein the inner conductor of the cable extends between the two physical connections.

13. The electric protective device of claim 1, wherein the housing comprises:
   a first end;
   an opening defined in the first end and sized to receive the intermediate insulating layer and the inner conductor of the cable;
   a second end opposite the first end;
   an external electrical connector positioned at the second end of the housing and providing an electrical connection outside the housing.

14. The electric protective device of claim 13, wherein the opening is coaxial with the external electrical connector.

15. The electric protective device of claim 13, wherein the inner conductor of the cable extends from the opening to the external electrical connector.

16. An electric protective device comprising:
   a housing having a first end, an opening defined in the first end, and a second end opposite the first end;
   an external electrical connector positioned at the second end of the housing and providing an electrical connection outside the housing;
   a cable including an outer conductor adapted to be connected to ground, an intermediate insulating layer, and an inner conductor adapted to carry current during normal operation, the inner conductor and insulating layer extending through the opening;
   a surge arrestor including at least one voltage dependent resistor positioned in the housing;
   an arrestor/cable electrical connector electrically connecting one end of said at least one voltage dependent resistor of said surge arrestor to said inner conductor of said cable; and
   a ground electrical connector electrically connecting another end of said at least one voltage dependent resistor of said surge arrestor to said outer conductor of said cable,
   wherein said at least one voltage dependent resistor of said surge arrestor extends along the inner conductor of the cable and is offset from and not coaxial with the inner conductor of the cable.

17. The electric protective device of claim 16, wherein:
   a physical connection between the ground electrical connector and the outer conductor of the cable is positioned at a first end of the voltage dependent resistor;
   a physical connection between the arrestor/cable electrical connector and the inner conductor of the cable is positioned at a second end of the voltage dependent resistor, the second end being located opposite the first end; and
   the inner conductor of the cable extends between the two physical connections.

18. The electric protective device of claim 16, wherein the opening in the housing is sized to receive the intermediate insulating layer and the inner conductor of the cable.

19. The electric protective device of claim 16, wherein the opening is coaxial with the external electrical connector.

20. The electric protective device of claim 16, wherein the inner conductor of the cable extends from the opening to the external electrical connector.

* * * * *